US011083172B2

(12) United States Patent
Onthank

(10) Patent No.: US 11,083,172 B2
(45) Date of Patent: Aug. 10, 2021

(54) CONNECTING DEVICE FOR A CARABINER

(71) Applicant: Nano Pet Products, LLC, Norwalk, CT (US)

(72) Inventor: Christopher Howse Onthank, Norwalk, CT (US)

(73) Assignee: NANO PET PRODUCTS, LLC, Norwalk, CT (US)

( * ) Notice: Subject to any disclaimer, the term of this patent is extended or adjusted under 35 U.S.C. 154(b) by 0 days.

(21) Appl. No.: 16/566,543

(22) Filed: Sep. 10, 2019

(65) Prior Publication Data

US 2020/0187458 A1   Jun. 18, 2020

Related U.S. Application Data

(63) Continuation-in-part of application No. 15/460,723, filed on Mar. 16, 2017, now Pat. No. 10,408,257, and a continuation-in-part of application No. 15/388,305, filed on Dec. 22, 2016, now abandoned, and a continuation-in-part of application No. 15/350,986, filed on Nov. 14, 2016, now Pat. No. 10,455,813.

(30) Foreign Application Priority Data

| Nov. 13, 2015 | (NL) | 2015789 |
| Dec. 23, 2015 | (NL) | 2016030 |
| Mar. 16, 2016 | (NL) | 2016443 |

(51) Int. Cl.
*A01K 27/00*   (2006.01)
*F16B 45/02*   (2006.01)

(52) U.S. Cl.
CPC .......... *A01K 27/003* (2013.01); *A01K 27/005* (2013.01); *F16B 45/02* (2013.01)

(58) Field of Classification Search
CPC ...... A01K 27/003; A01K 27/005; F16B 45/02
See application file for complete search history.

(56) References Cited

U.S. PATENT DOCUMENTS

| 760,171 | A | 5/1904 | Atwell |
| 865,094 | A | 9/1907 | Fields |
| 4,501,230 | A | 2/1985 | Talo |
| 4,541,364 | A * | 9/1985 | Contello ............. A01K 27/005 119/772 |
| 4,791,886 | A | 12/1988 | Anderson |
| 4,947,801 | A | 8/1990 | Glass |
| 5,003,929 | A | 4/1991 | Dean |

(Continued)

FOREIGN PATENT DOCUMENTS

| DE | 20216878 | 3/2004 |
| GB | 1131886 | 10/1968 |
| WO | 2013/177681 | 12/2013 |

*Primary Examiner* — Robert Sandy
*Assistant Examiner* — David M Upchurch
(74) *Attorney, Agent, or Firm* — Peacock Law P.C.; Janeen Vilven

(57) ABSTRACT

A connecting device for a carabiner, having a first connection part for connecting said device to a base member and at least two second connection parts for connecting said device to at least two carabiners. The device is characterized in that said at least two second connection parts each are a rotatable and tiltable connection part. Preferably, said second connection parts each are embodied as a concave socket for coupling to a carabiner comprising a convex body.

9 Claims, 10 Drawing Sheets

(56) References Cited

U.S. PATENT DOCUMENTS

| | | | |
|---|---|---|---|
| 5,852,988 A * | 12/1998 | Gish | A01K 27/003 119/795 |
| 5,887,550 A | 3/1999 | Levine et al. | |
| 5,901,668 A * | 5/1999 | Goodger, Sr. | A01K 27/003 119/795 |
| 6,273,029 B1 | 8/2001 | Gish | |
| 6,530,345 B2 | 3/2003 | Donze | |
| 6,626,132 B1 * | 9/2003 | Mann | A01K 27/003 119/769 |
| 6,948,218 B1 | 9/2005 | Donze | |
| 7,389,750 B1 | 6/2008 | Rogers et al. | |
| 7,467,604 B1 | 12/2008 | Werner et al. | |
| 7,757,639 B1 | 7/2010 | Prendes | |
| 8,100,445 B1 | 1/2012 | Brar | |
| 8,573,160 B1 | 11/2013 | Knight | |
| 8,875,353 B2 | 11/2014 | Miron | |
| 8,955,465 B1 | 2/2015 | Vandommelen | |
| 2002/0179023 A1 | 12/2002 | Axel | |
| 2005/0263103 A1 | 12/2005 | Updyke et al. | |
| 2005/0264016 A1 | 12/2005 | Davis | |
| 2006/0065210 A1 | 3/2006 | Tozawa | |
| 2006/0272595 A1 | 12/2006 | Edwards | |
| 2008/0173257 A1 | 7/2008 | Steiner et al. | |
| 2008/0216767 A1 | 9/2008 | Wang | |
| 2009/0283055 A1 | 11/2009 | Laske | |
| 2011/0197820 A1 | 8/2011 | Goldy | |
| 2012/0006284 A1 | 1/2012 | Messner | |
| 2012/0098281 A1 | 4/2012 | Sigmund | |
| 2013/0133593 A1 | 5/2013 | Church | |
| 2014/0283759 A1 | 9/2014 | Bianchi | |
| 2015/0090196 A1 | 4/2015 | Fleming et al. | |
| 2015/0107532 A1 | 4/2015 | Shaver et al. | |
| 2015/0245594 A1 | 9/2015 | Bernard | |
| 2015/0282456 A1 | 10/2015 | Harley | |
| 2017/0037589 A1 | 2/2017 | Rivadeneira | |
| 2017/0135319 A1 | 5/2017 | Onthank et al. | |
| 2017/0181406 A1 | 6/2017 | Onthank et al. | |
| 2017/0268565 A1 | 9/2017 | Onthank | |
| 2017/0360007 A1 | 12/2017 | Wu | |

* cited by examiner

CONNECTING DEVICE FOR A CARABINER

CROSS-REFERENCE TO RELATED APPLICATIONS

This application is a Continuation-in-Part of U.S. patent application Ser. No. 15/460,723, entitled "Connecting Device for a Carabiner", filed on Mar. 16, 2017, and issued as U.S. Pat. No. 10,408,257 on Sep. 10, 2019, which claims priority to and the benefit of the filing of Netherlands Patent Application No. 2016443, filed on Mar. 16, 2016; and is also a Continuation-in-Part of U.S. patent application Ser. No. 15/388,305, entitled "Handgrip for a Leash, a Combination of the Handgrip and a Functional Element, and the Functional Element for Use Thereof", filed on Dec. 22, 2016, which claims priority to and the benefit of filing of Netherlands Patent Application No. 2016030, filed on Dec. 23, 2015; and is also a Continuation-in-Part of U.S. patent application Ser. No. 15/350,986, entitled "Handgrip for a Leash", filed on Nov. 14, 2016 which claims priority to and the benefit of the filing of Netherlands Patent Application No. 2015789, filed on Nov. 13, 2015. The specification and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field)

The present invention relates to a connecting device for a carabiner. This connecting device may be used with a dog leash, a horse leash, in mountain climbing or the like.

Description of Related Art Including Information Disclosed Under 37 C.F.R. §§ 1.97 and 1.98

Connecting a carabiner to another item is known in the art. For example, a carabiner may be used for coupling a dog leash to another item, for example a pole, a bike or a handgrip. Also, carabiners are used for mutually coupling other products, like ropes.

Hereafter, reference will be made mainly to use of the device according to the invention with dog leashes and, more in particular, a handle or hand grip for a dog leash. In this respect, it is known to apply a hand grip to which a dog leash is connected. Said known connecting device may suitably be comprised of a ring-shaped opening in the hand grip, the carabiner being inserted into said opening, after which part of the dog leash is inserted into the carabiner as well, so as to mutually connect the hand grip and the dog leash through said carabiner.

Although a sufficient connection between dog leash and hand grip is obtained this way, a user may experience deficiencies in that the dog exerts large forces to the user's hand holding the hand grip. Such also applies in other types of use, for example in handling of horses and in mountain climbing. With respect to mountain climbing, items that are connected to carabiners may provide a nuisance to the user since these are easily entangled.

Therefore, there is a need for a product providing a solution for connecting a carabiner to another device, for example but not limited to a hand grip for a dog leash.

BRIEF SUMMARY OF THE INVENTION

The invention therefore aims at providing an improved connecting device for a carabiner.

More in particular, the invention aims at providing a connection device for a carabiner, allowing a user to handle a plurality of items connected thereto and preventing entanglement of separate items connected to said carabiners.

The invention also aims at providing a connection device for mutually coupling other items, allowing these items a large degree of freedom.

So as to obtain at least one of these goals, the present invention relates to a device comprising the features of claim 1. This connection device provides the advantage that entanglement of items coupled to said different carabiners is virtually completely prevented.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 2:
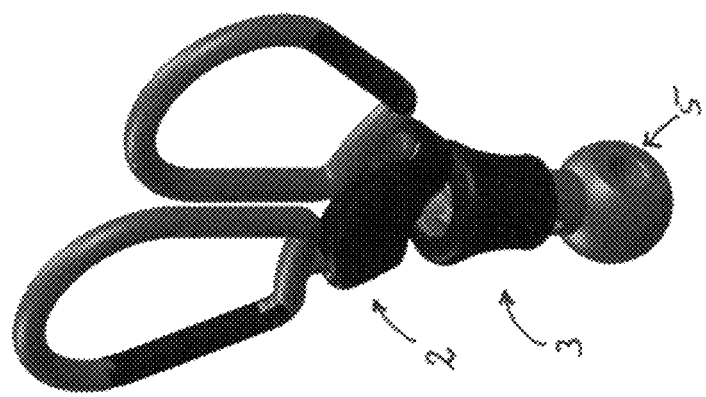
FIG. 2 shows a schematic isometric view of the use of a device according to FIG. 1.

The connecting device for a carabiner according to the present invention comprises a first connection part for connecting said device to a base member and at least two second connection parts for connecting said device to at least two carabiners, and is characterized in that said at least two second connection parts each are a rotatable or tiltable connection part.

According to a preferred embodiment, said second connection parts each are embodied as a concave socket for coupling to a carabiner comprising a convex body. A convex body provides an optimum freedom of movement if same is inserted in a concave pocket. As a matter of fact, the convex body is constrained within the concave pocket such that both parts are mutually connected. Such connection may be releasable or permanent.

According to another embodiment, at least one of said first and second connection parts are embodied as a detachable coupling. Such provides the advantage that carabiners may be detached from the connection device and the base member.

A still further preferred embodiment relates to a connecting device, wherein said first connection part is comprised as a convex body, preferably an at least partially spherical body, for coupling to a concave body provided in said base member. Said convex body provides an optimum freedom of movement if same is inserted in a concave pocket. As a matter of fact, the convex body is constrained within the concave pocket such that both parts are mutually connected. Such connection may be releasable or permanent.

When said at least two second connection parts each are a rotatable and tiltable connection part, a large degree of freedom is obtained. Especially when walking two dogs, for example, the dogs may roam freely, without the leashes becoming entangled. Also, when a first dog walks to the right and the other to the left, the tiltability and rotatability provides the advantage that the forces acting on the device are small.

In this respect, it is especially preferred that said first connection part for connecting said device to a base member is a rotatable or tiltable connection part.

Even more preferred in the connecting device, is that said first connection part for connecting said device to a base member is a rotatable and tiltable connection part. Such combination provides highest advantages in handling the device and, in particular, a plurality of leashes.

It has shown that it is preferred for the connection parts to provide a tilt angle of at least 5°, more preferably at least 10°, still more preferably to a maximum of 20°. The angle is calculated with respect to a center position, the concave part and convex part having a freedom of tilt with respect to said center position of preferably at least 5°, more preferably at least 10°.

A maximum advantageous freedom is obtained if said connection parts being rotatable over 360°. Such is preferably provided both by the first connection part for connecting said device to a base member and the at least two second connection parts for connecting said device to at least two carabiners.

Finally, said base part is preferably embodied for slidable connection to a rail provided at a handgrip for a dog leash. Such provides a still further preferred embodiment, allowing a dog to roam around with a large degree of freedom and lots of ease for the user.

In the figures, the same and similar parts are identified and denoted by the same reference numerals. However, for ease of understanding the invention, not all parts that are necessary for a practical embodiment are shown in the drawing. The drawings only show schematic embodiments. Reference will be made mainly to use of the invention with a handgrip for walking a dog on a leash, although the invention is not limited to such use. The connecting device according to the invention can be used for any suitable application.

Figure 1:
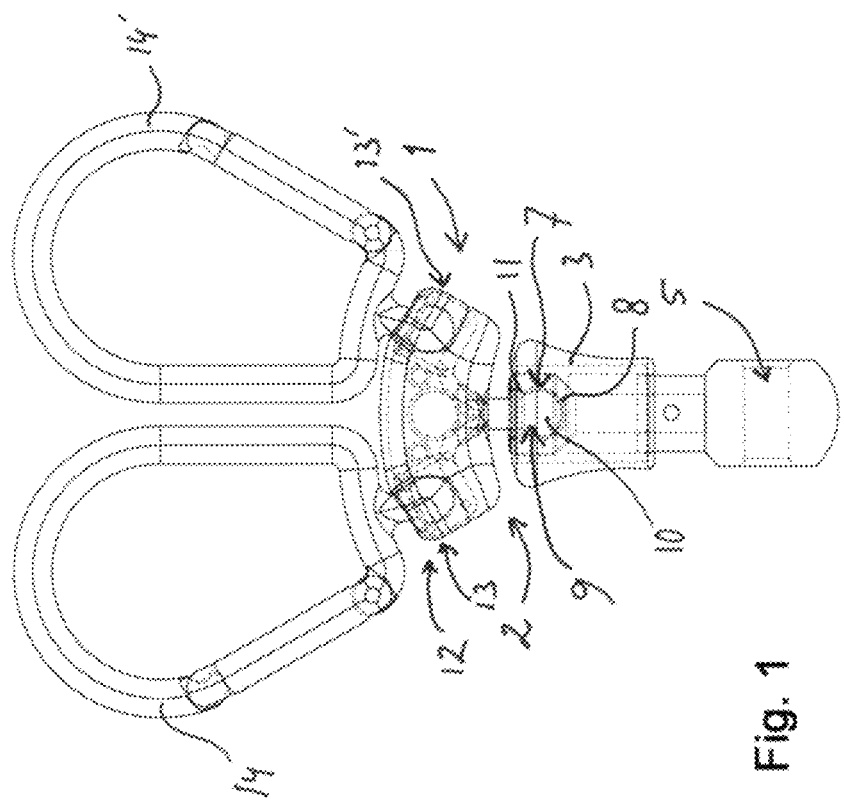
FIG. 1 shows a schematic side view of a use of a device according to one embodiment of the present invention.
Figure 5:
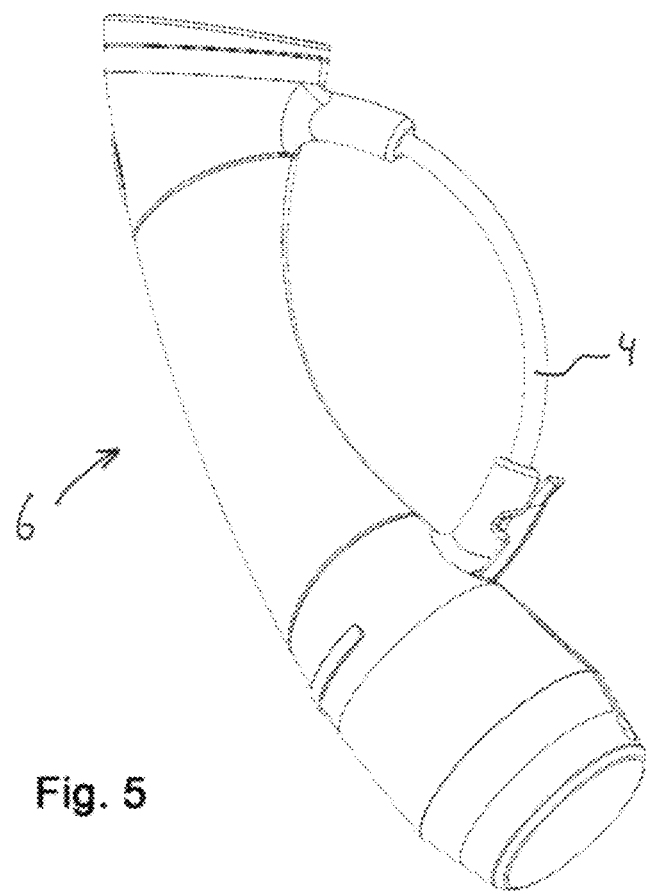
FIG. 5 shows a schematic isometric view of a hand grip for a dog leash for use with the device according to one embodiment of the present invention.

FIG. 1 shows a schematic side view of a connecting device 1. The connecting device 1 is at a first side 2 coupled to a base member 3. The base member 3 is embodied for receiving a bar 4 (shown in FIG. 5) in a through-opening 5, for sliding coupling thereto. The base member 3 then is coupled slidingly to a hand grip 6 for a dog leash, as shown in FIG. 5.

At said first side 2 the device 1 according to the invention is provided with a connection part 7, embodied as a concave recess 8, for receiving a cooperative connection member 9, embodied as a convex or spherical body 10. Said body 10 is inserted in said recess 8, such that a mutual coupling is obtained. The outer diameter of the spherical body 10 may be smaller than the inner diameter of the recess 8. Such combination of dimensions of recess 8 and spherical body 10 provides a rotational freedom of movement of said connecting device 1 with respect to the base member 3. However, a substantially rigid coupling is possible as well. A shoulder 11 is provided to prevent removal of said body 10 from said recess 8.

The shoulder 11 may be operable so as to, in a first step, move the shoulder 11 aside and provide a relatively larger access for inserting cooperative connection member 9 into said recess 8 and, in a second step, have the shoulder 11 return to its original position so as to lock said cooperative connection member 9 in said recess 7.

At a second side 12 of said device 1 two second connection parts 13, 13' are provided for connecting said device 1 to at least two carabiners 14, 14'. In the embodied shown in the drawing, the second connection parts 13, 13' are embodied analogous to the first connection part 7.

Figure 3:
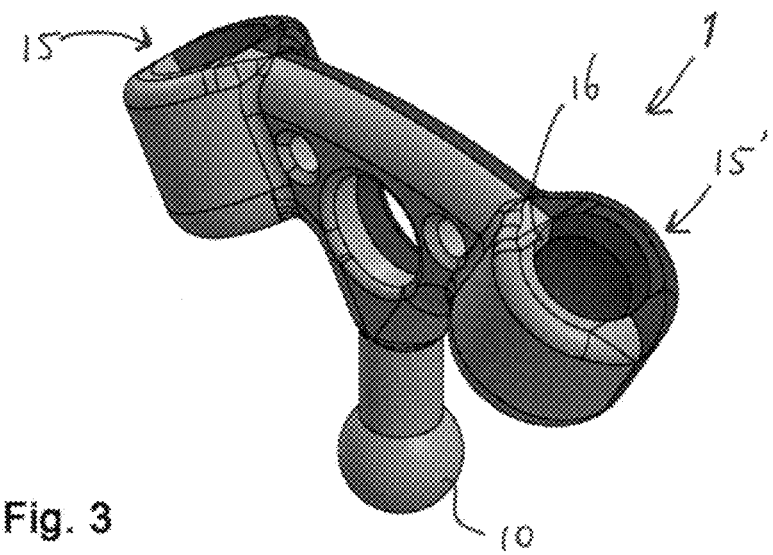
FIG. 3 shows a schematic isometric view of a connecting device according to one embodiment of the present invention.

FIG. 3 shows an isometric view of the device 1 according to the invention. As shown in the figure, the device 1 comprises at first side 2 a spherical body 10, for insertion in a concave recess in the base member (not shown in FIG. 3). The spherical shape of the body 10 allows a rotational movement as well of the device 1 with respect to the base member.

Furthermore, the device 1, as shown in FIG. 3, comprises two recesses 15, 15' for each receiving a spherical body of a carabiner to be coupled to said device 1. Such combination of recess 15, 15' and spherical bodies provides a rotational freedom of movement of said carabiners with respect to said device 1 where the outer diameter of the spherical body is smaller than the inner diameter of the recess 15, 15'. The said recesses 15, 15' each are provided with a collar 16, such that said carabiners' spherical body is restrained within said recess 15, 15'. The carabiner's spherical body is connected to the carabiner by means of a neck, the diameter of said neck being smaller than the diameter of said spherical body. By embodying said collar 16 such that it fits loosely around said neck, the carabiner has a degree of freedom such that a tilting movement may be made with respect to said device 1. Due to the spherical shape of said body, the carabiner also has a freedom of rotation with respect to the device 1.

The collar 16 may be operable so as to, in a first step, move the collar 16 aside and provide a relatively larger access for inserting a carabiner's spherical body into said recess 15, 15' and, in a second step, have the collar 16 return to its original position so as to lock said carabiner's spherical body in said recess 15, 15'.

Alternatively, the collar 16 may be embodied such that the carabiner's spherical body snap fits into said recess 15, 15'.

Figure 4:
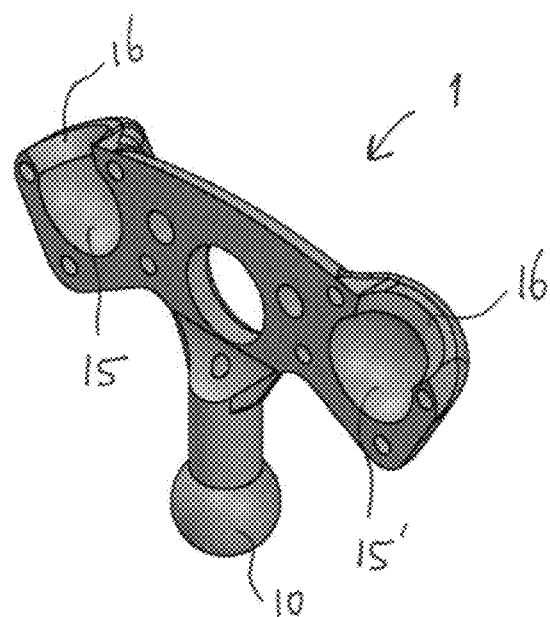
FIG. 4 shows a schematic isometric view of a cut out portion of a connecting device according to FIG. 3.

FIG. 4 shows a cut out part of the device 1. The collar 16 is clearly visible, as are the recesses 15, 15'.

Figure 6:
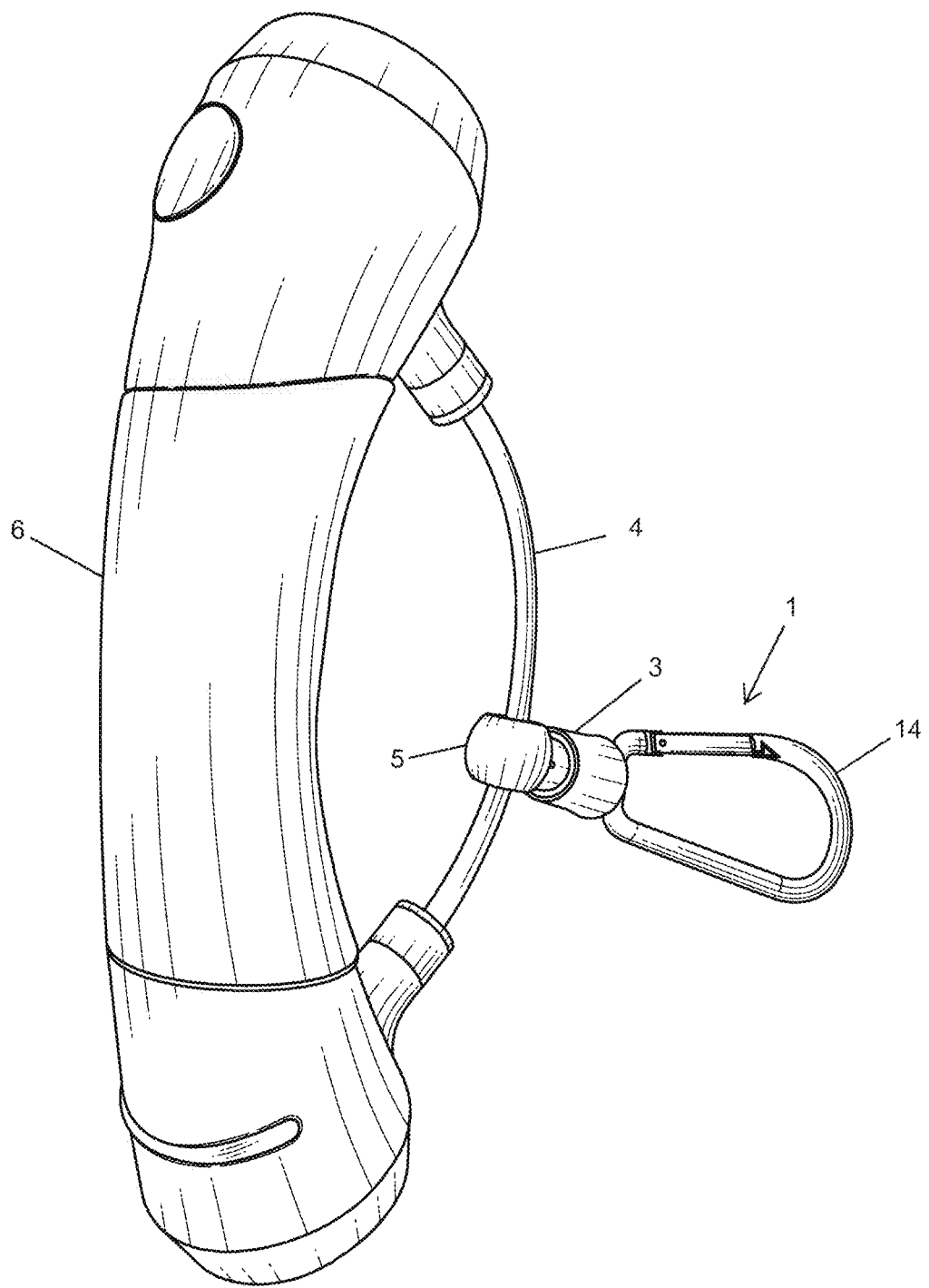
FIG. 6 illustrates a perspective view of a hand grip for a lease according to one embodiment of the present invention having a carabiner 20 positioned on the slide bar.
Figure 7:
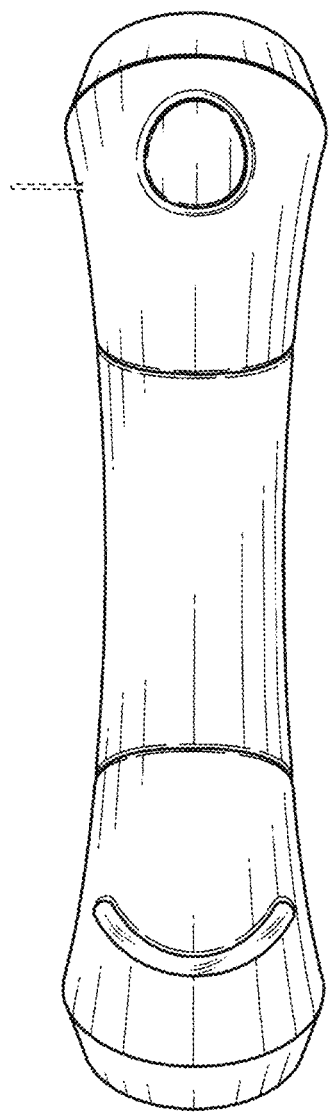
FIG. 7 illustrates a back view of a hand grip according to one embodiment of the present invention.
Figure 8:
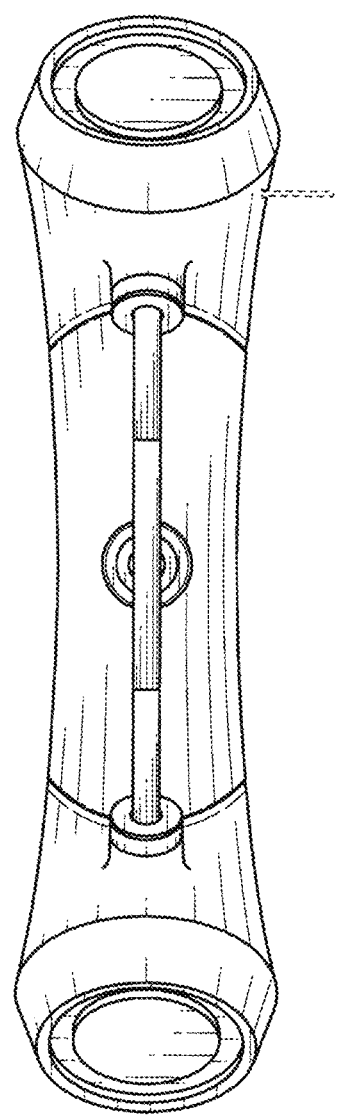
FIG. 8 illustrates a front view of a handgrip according to one embodiment of the present invention.
Figure 9:
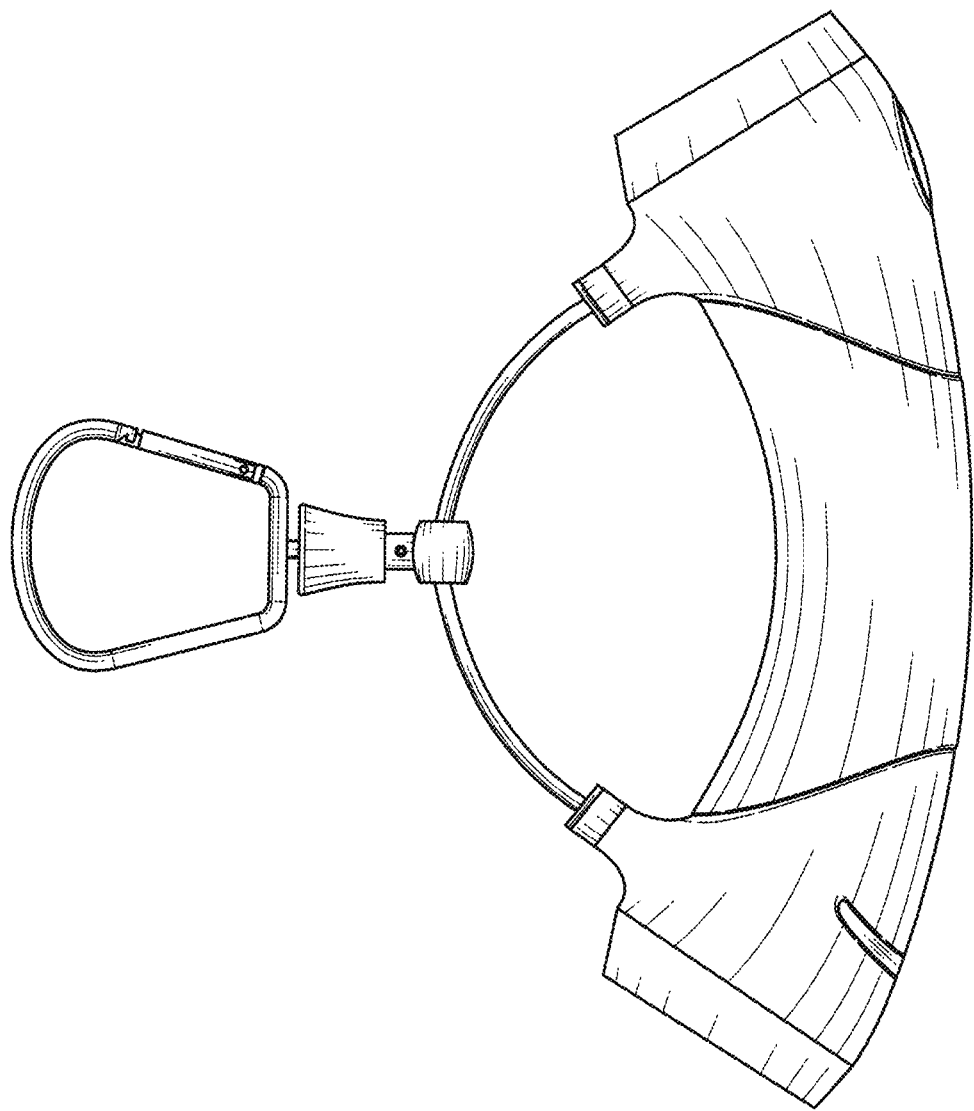
FIG. 9 illustrates a right side view of a hand grip according to one embodiment of the present invention.
Figure 10:
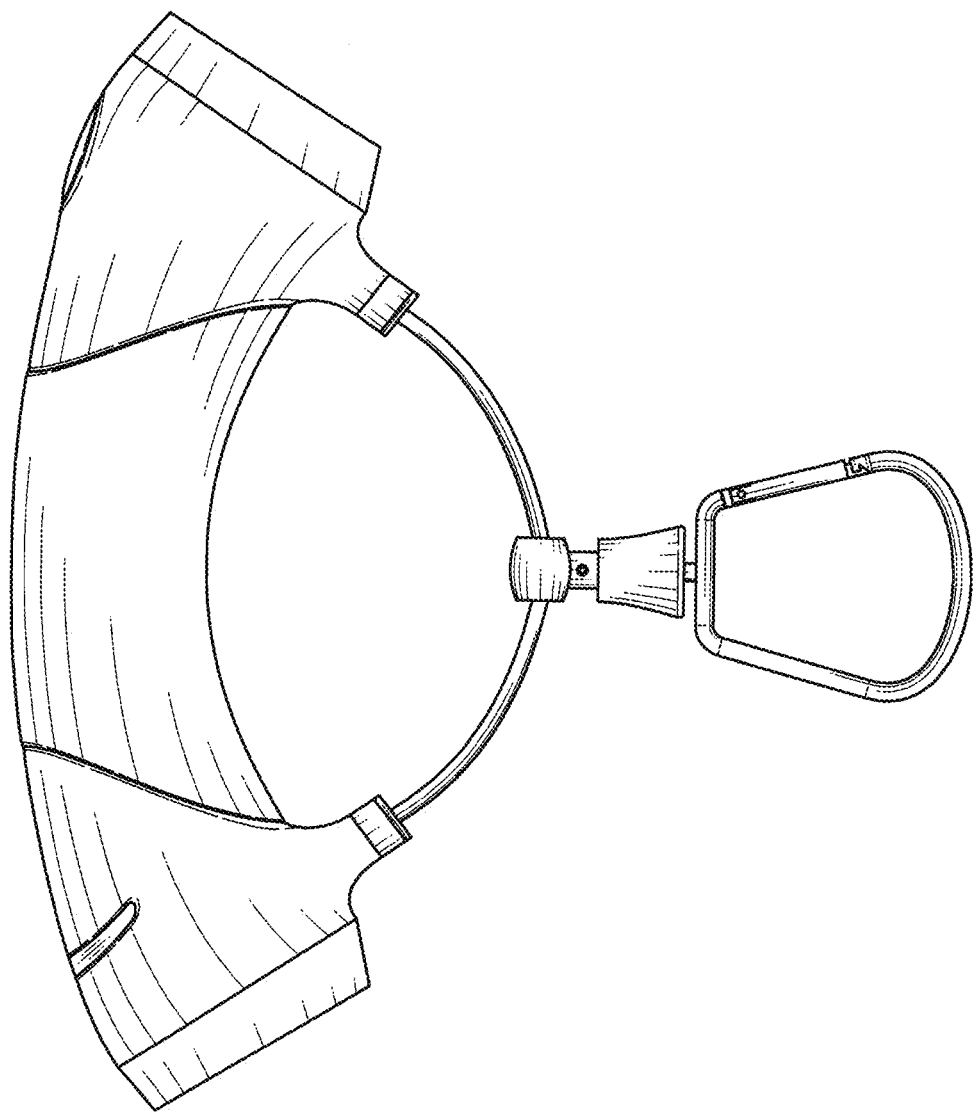
FIG. 10 illustrates a left side view of a hand grip according to one embodiment of the present invention.
Figure 11:
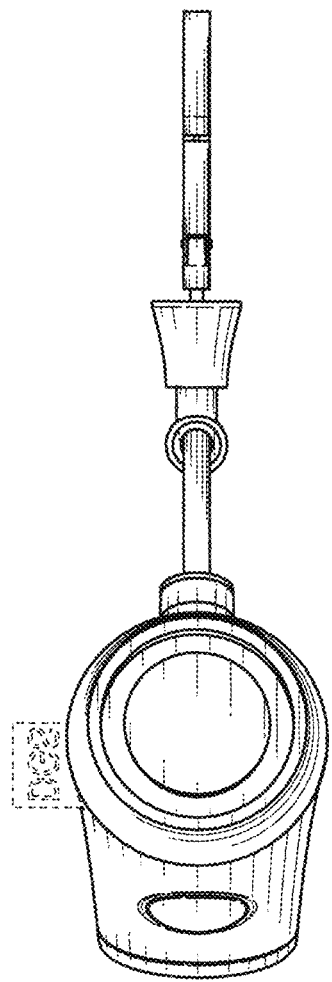
FIG. 11 illustrates a top view of a hand grip of one embodiment of the present invention.
Figure 12:
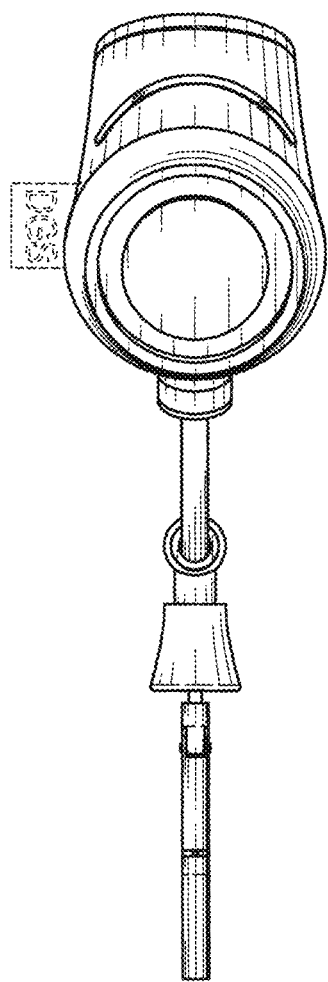
FIG. 12 illustrates a bottom view of a hand grip according to one embodiment of the present invention.

FIG. 5 illustrates a handgrip 6 for a lease according to one embodiment of the present invention wherein slide bar 4 is coupled to connecting device 1 through opening 5 as illustrated in FIG. 6.

FIG. 6 illustrates a single carabiner 14 that is connected to body 3 and attached to slide bar 4 via a through-opening 5. The body 3 can also support at least two carabiners as illustrated in FIG. 1.

FIG. 7-12 illustrates different views of the handgrip 6 according to one embodiment.

Figure 13:
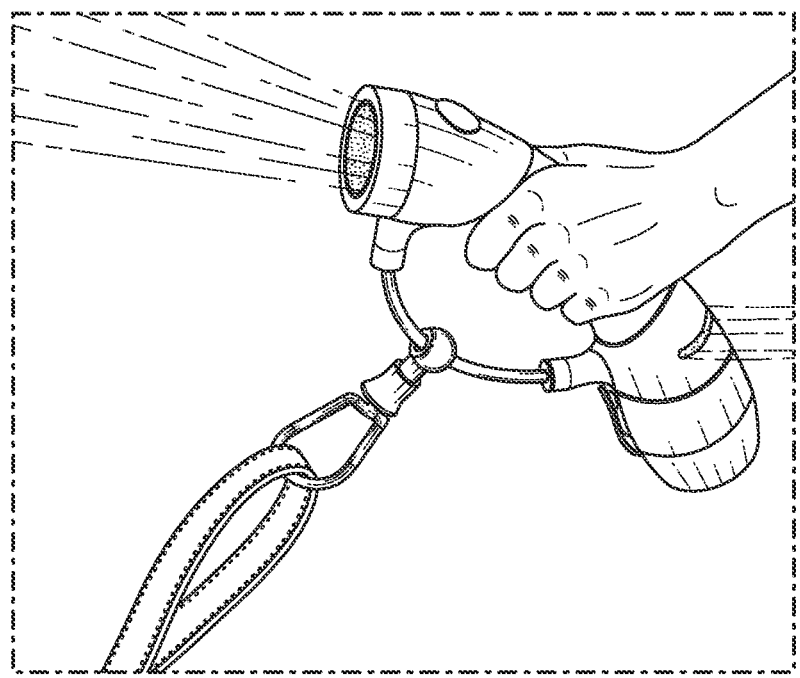
FIG. 13 illustrates a leash engaged with the hand grip through the connecting device according to one embodiment of the present invention.

FIG. 13 illustrates the handgrip for a leash with the leash attached to a single carabiner according to one embodiment of the present invention.

Figure 14:
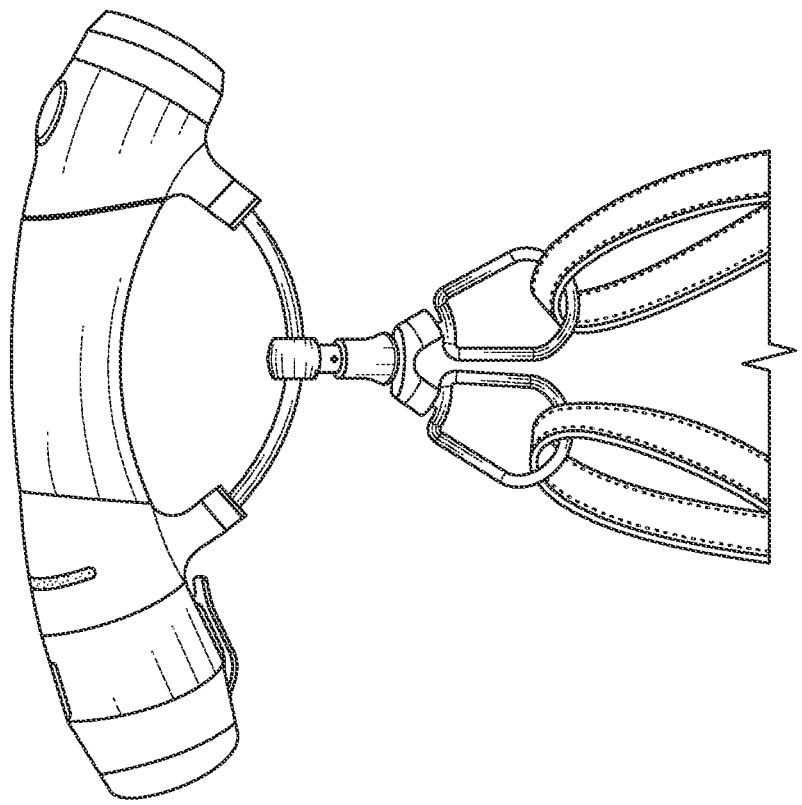
FIG. 14 illustrates a leash engaged with the hand grip through the connecting device according to one embodiment of the present invention.

FIG. 14 illustrates the handgrip for a leash with the rail attached to the connecting device supporting two carabiners with leashes attached.

The invention is not limited to the embodiments as mentioned above and as shown in the drawing. The invention is limited only by the appending claims.

The invention also embodied all combination of features that have been described independently of each other.

What is claimed is:

1. A connecting device for a carabiner, comprising a first connection part for connecting the connecting device to a base member wherein the first connection part is comprised as a convex protrusion for coupling to a concave socket provided in the base member and at least two second connection parts for connecting the connecting device to at least two carabiners each of the at least two second connection parts being embodied as a concave socket for coupling to a convex protrusion on each carabiner, such that when the convex protrusion from the carabiner is within the concave socket, the convex body of the carabiner is rotatable and tiltable relative to the connecting device.

2. The connecting device according to claim 1, wherein at least one of the first and second connection parts is embodied as a detachable coupling.

3. The connecting device according to claim 1, wherein the first connection part is comprised as an at least a partially spherical body.

4. The connecting device according to claim 1, wherein a connection between said convex body for coupling to the concave body provided in the base member is a rotatable and tiltable connection.

5. The connecting device according to claim 1, the the first connection part and the at least two second connection parts being tiltable over at least 5°.

6. The connecting device according to claim 5, the the first connection part and the at least two second connection parts being tiltable over at least 10°.

7. The connecting device according to claim 6, the the first connection part and the at least two second connection parts being tiltable to a maximum of 20°.

8. The connecting device according to claim 1, wherein the the first connection part and the at least two second connection parts are rotatable over 360°.

9. The connecting device according to claim 1, wherein the base part is embodied for slidable connection to a rail provided at a handgrip for a dog leash.

* * * * *